March 19, 1963  J. INTRAUB ET AL  3,081,622
DEVICE FOR THE MEASUREMENT OF VIBRATION DISPLACEMENT
Filed Dec. 17, 1959
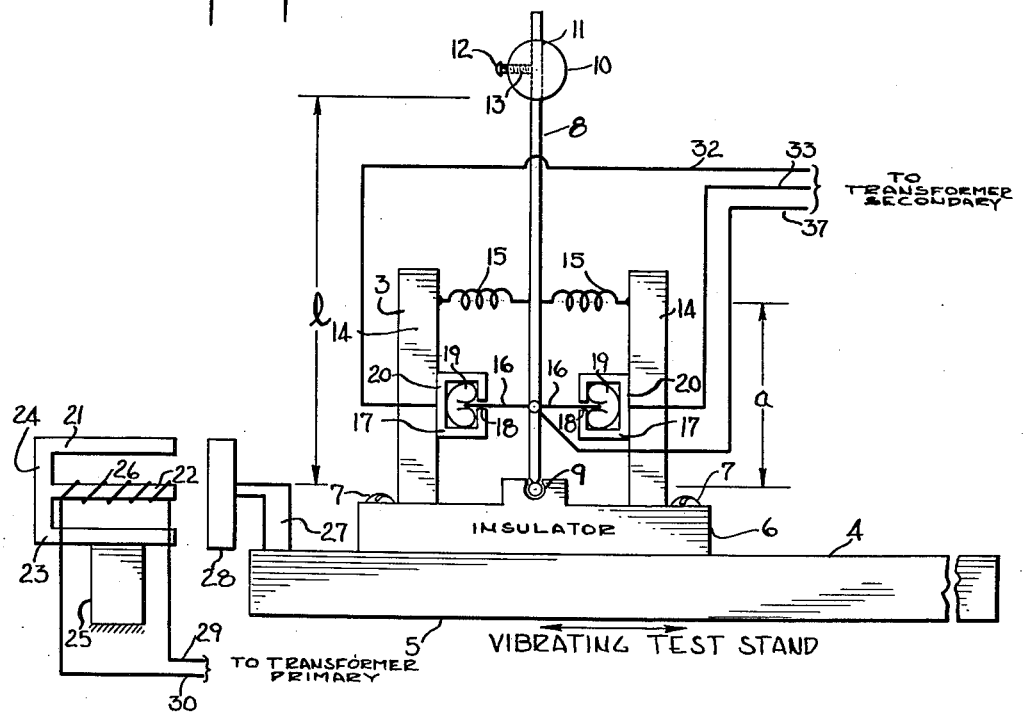
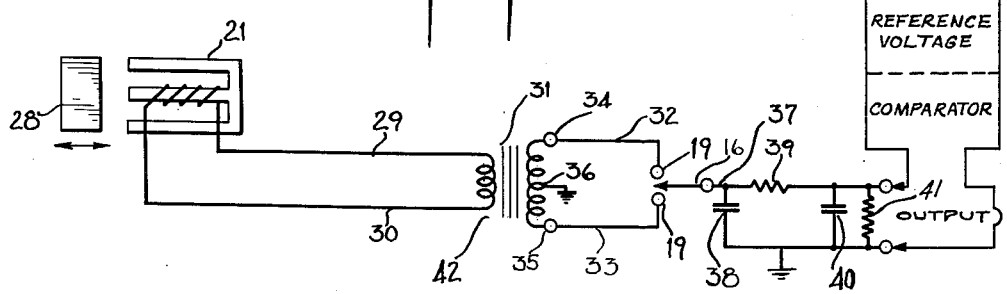
INVENTORS:
JULIUS INTRAUB
MARTIN O. KALB
BY
Max D Farmer
ATTORNEYS United States Patent Office 3,081,622
Patented Mar. 19, 1963

3,081,622
DEVICE FOR THE MEASUREMENT OF
VIBRATION DISPLACEMENT
Julius Intraub, Plainview, and Martin O. Kalb, New York, N.Y., assignors to the United States of America as represented by the Secretary of the Navy
Filed Dec. 17, 1959, Ser. No. 860,296
12 Claims. (Cl. 73—71.4)
(Granted under Title 35, U.S. Code (1952), sec. 266)

The invention described herein may be manufactured and used by or for the Government of the United States of America for governmental purposes without the payment of any royalties thereon or therefor.

This invention relates to vibrating machines and vibration test equipment and more particularly to a system for measuring amplitude and frequency of vibration.

With the advent of modern technology and equipment, it has become exceedingly important to determine the effect of vibration on various systems and equipment. Vibration test-stands and tables have been developed which can vibrate the equipment under evaluation at various frequencies and amplitudes in any of three mutually perpendicular planes over an extended frequency spectrum.

In order that the evaluation be accurate, the amplitude and frequency of vibration must be known and under certain circumstances must be maintained constant over a prescribed period of time.

Heretofore, various methods have been employed to determine the frequency and amplitude of vibration. One such method involves the use of a reluctance pickup operatively coupled to the vibrating member to provide an A.C. output signal which bears a predetermined relationship in frequency and amplitude to the mechanical vibration frequency and amplitude. This A.C. signal is then fed into a rectifier such as a silicon or germanium diode wherein the signal is converted from A.C. to D.C. The prime disadvantage of this method lies in the fact that rectifiers of this type are inherently nonlinear and, therefore, introduce unwanted distortion. Further, when the voltage across a rectifier of this type is small vertually no current passes through the rectifier and the forward to back resistance of the rectifier approaches unity.

Another method of rectifying the A.C. signal from the pickup is to use a chopper driven electromagnetically from another A.C. source. If the frequency of vibration of the test stand is absolutely constant then the chopper can be driven at this frequency with good rectification, it being only necessary to establish the correct phase relationship between the chopper and the test stand. If, however, as is usually the situation, the test stand does not vibrate at an absolutely constant frequency but drifts slightly, then it is impossible to employ an independent electromagnetic chopper for rectification since it cannot follow the frequency drift. In order to overcome this drawback in operation, it has been suggested that the chopper be driven from the output of an amplifier inserted between the chopper and the pickup. That is, the output of the pickup is amplified sufficiently to drive the chopper and thereby theoretically maintain the chopper frequency at the vibration frequency. This however, introduces a problem of drift in the amplifier and phasing error between the pickup and chopper. Attempts have been made to employ such a system but without any appreciable success.

An object of this invention is to provide a simple, practical, efficient, accurate and inexpensive system for the determination of the frequency and amplitude of vibration of vibrating members.

Another object is to provide a simple, inexpensive, practical, mechanically tunable vibration actuated synchronous switch.

A still further object of this invention is to provide control system which automatically maintains a constant amplitude of vibration of a vibrating test stand and which is simple, efficient, practical and inexpensive.

Other objects and many of the attendant advantages of this invention will be readily appreciated as the same becomes better understood by reference to the following detailed description when considered in connection with the accompanying drawing wherein:

FIG. 1 is a front elevation in section of an embodiment made in accordance with this invention, and FIG. 2 is an electrical wiring diagram of a circuit employed with the embodiment of this invention.

In the embodiment of the invention illustrated in FIG. 1 a synchronous switch 3 is rigidly mounted on the upper surface 4 of a vibration test stand table 5 by a plate 6 of rigid electrically insulating material. The plate may be secured to the table 5 by any suitable means, as for example, screws 7 passing through the plate and threaded into the table. A structurally rigid stiff rod member 8 having a bulb-like end portion which is seated in a socket recess in the center of the upper surface 4 of the plate 6 forming a ball and socket joint permitting relatively free pivotal motion of the rod with respect to the plate 6 and extending approximately vertically with respect to the plate 6. A jeweled bearing, for example, may also be employed to allow the rod 8 to freely pivot. An inertial mass 10 having a passage 11 therethrough for receiving the rod 8 is adjustably positioned lengthwise along the rod 8 and may be secured in any desired position along the length of the rod by set screw 12 which passes through an opening 13 in the inertial mass 10 perpendicular to the rod and when screwed inwardly toward the rod head tightly abuts the surface of the rod so as to securely position the mass 10 along the rod 8. The rod 8 may be provided with a flat lengthwise edge surface against which the set screw head may abut for positive positioning.

Electrically insulative rectangular vertical support members 14 are disposed on opposite sides of the rod 8 extending in a direction parallel to the rod and with their broader faces perpendicular to the direction of vibration of the test stand so that the rod 8, will, under the movement of the test stand, oscillate in a plane between the support members in a plane perpendicular to the supports 14. Rigidly affixed to each of the support members 14 and the rod 8 are coil springs 15 whose axes are aligned with one another and perpendicular to the rod 8 when the rod is in its undeflected vertical position. These springs 15 apply restoring forces to the rod 8 when the rod is deflected from its rest or undeflected position.

Extending laterally from the rod 8 and in the direction of the support members 14 and disposed intermediate between the springs 15 and the plate 6 are two leaflike electrically conducting contact members 16. The contact members are electrically conected to each other and may be of any good electrically conducting spring-like metal, as for example, beryllium copper. Rigidly mounted on each of the support members 14 is an enclosure 17 having a horizontally extending opening 18 facing the rod 8 so as to permit the entrance of the free end portion of the contact member 16 when the rod is deflected in the direction of that enclosure or support member. The enclosure 17 may be of any desirable shape and of any rigid dielectric material, as for example, phenolic plastic widely sold under the trade name of Bakelite, and the vertical height of the opening 18 just sufficient to guide the contact member 16 into the opening. Confined or secured within the enclosure is an electrically conducting pressure or spring contacting member 19 which makes positive electrical contact with the contact arm 16. The spring contact 19 may be constructed of beryllium copper or any suitable spring-like metal and formed so as to exert pressure against the surface of the contact arm 16 and yet permit lateral movement of the contact arm within the enclosure. Various configurations of this spring contact are possible, as for example, a cardioid shape so that the contact arm enters and contacts the opposing sections of the cardioid spring contact which face one another and are substantially parallel to the contact arm and is guided therebetween making electrical contact to the spring contact member. Electrical contact may be made directly to the spring contact member or the wall 20 of the enclosure 17 furthest from the rod against which the spring contact abuts may be of any electrically conducting material and electrical connection made to the spring contact through this wall 20.

Moving members or parts of switches possess natural frequencies of vibration in that there is a frequency or a band of frequencies at which each moving switch member will vibrate resulting in failure or other undesirable physical phenomenon in the switch in resonance when the switch is subjected to a sharp mechanical impulse or vibrated at some frequency near the resonant frequency of the moving switch part. The evaluation of equipment when subjected to vibrational displacement necessitates a continuous run through various vibration frequencies from very low to high frequencies and so the switch employed in the evaluation must be able to accurately follow the frequency of vibration without itself being resonant within that range. The switch illustrated in FIG. 1 satisfies this requirement by employing the seismic quality of the inertial mass 10 and its natural or resonant frequency of vibration is defined by the following equation:

$$w^2 = g/l + 2ka^2/ml^2$$

where, $w$ is the natural frequency of vibration of the rod 8.
$l$ is the distance from the inertial mass 10 to the pivot point 9.
$k$ is the spring constant of the coil springs 15.
$a$ is the weight of the spring above the pivot point 9.
$m$ is the mass of the inertial mass 10, and
$g$ is the gravitational constant.

It may readily be seen that by selectively adjusting the distance between the pivot point 9 and the inertial mass by means of the set screw 12 the natural frequency of vibration of the rod may be selected to be lower than any frequency at which the vibration test stand 5 will be operated. The illustrated switch will, therefore, function so that all vibration frequencies higher than the selected natural frequency of vibration of the switch, the inertial mass 10 will remain stationary relative to the vibrating motion of the base or plate 6 which vibrates in synchronism with the test stand.

Since the contact arms 16 are electrically connected to one another and disposed intermediate of the pivot and the inertial mass they will vibrate in the vertical plane in synchronism with the test stand and alternately electrically contact each of the spring contact members 19. In order to reduce the open circuit time between alternate contacts, the lateral length of the contact arms 19 are chosen so that when the rod 8 is in its undeflected position, each contact arm 16 is just physically contacting the spring member 19 toward which it is directed. This insures that there will be a make-before-break contact as the rod pivots under the vibrational motion of the test stand.

An amplitude pick-up unit 21 is provided to convert the displacement of the test stand table top 5 relative to a fixed stationary reference position into an electrical signal. The pick-up illustrated in FIG. 1 is of the magnetic type although other devices may be employed equally well. A permanent magnet 22 is rigidly mounted between and parallel to the arms of a U shaped member 23 constructed of soft iron or other suitable magnetic material. It is preferable to mount the magnet to the back arm 24 equidistant between the parallel arms of the unit 21 without any air gap between the magnet and the back arm of the U shaped member on which it is mounted thereby forming an E shaped structure with the magnet extending between and in a direction lengthwise of the arms so that the free ends arms and the magnet are equidistant from the back arm 24. The E structure is rigidly supported on a stationary fixed surface by a non-magnetic support 25 and a coil 26, consisting of several thousand turns of wire, is wound around the magnet 22. Mounted near an edge and on the upper surface of the test stand by a non-magnetic support 27 is a plate-like soft iron target 28 whose broad face surface is directed toward the open end of the E shaped magnetic structure 21. The target is mounted so that as the test stand 5 vibrates, it will move toward and away from the open end of the magnetic pickup structure thereby altering the magnetic flux path which exists between the free ends of the magnet 22 and the arms 23 and the target 28. Any relative motion between the magnetic pickup structure 21 and the target 28 results in a change of flux density and thereby induces a voltage across the coil 26 and a current in the wires 29 and 30. The amplitude of this current is a function of the relative distance between the target and the pickup structure and, therefore, is a function of the displacement of the test stand 5 provided the frequency of vibration remains approximately constant. As the test stand vibrates, a sinusoidal current is developed in the wires 29 and 30 and applied to the primary of a transformer 31 by these wires illustrated in FIG. 2. Wires 32 and 33 connect the spring contact members 19 to the outer terminals 34 and 35 of the secondary of the transformer 31 while the transformer secondary center-tap 36 is grounded. The contact arms 16 of the switch are connected by wire 37 to any well-known power supply filter, for the removal of ripple, as for example, that illustrated in FIG. 2 which comprises a capacitor 38 input and a series resistor or inductor 39 followed by another parallel capacitor 40 with both capacitors grounded and the filter output taken across a resistor 41 connected across the output line and ground.

Alternately, if desired, an electrostrictive transducer or a carbon microphone may be substituted for the magnetic pickup 21 and the target 28. If a microphone is to be used, the carbon elements would be mounted between an inertial loading mass and a stationary base which is firmly mounted on the vibration table so that the movement of the table will alternately compress and release the carbon elements between the loading mass and the base. The variation and magnitude in the resistance across the carbon elements will correspond to the amplitude of displacement and frequency of the vibration test stand.

The switch 3 and the target 28 are mounted and positioned on the test stand so as to be removed from the equipment under test which is mounted on the test stand 5 and both the switch and target may be reoriented on the test stand so that their relative motions will be in the same direction as the direction of vibration of the test stand where the plane or direction of vibration is changed. An equation may also be derived for the switch resonance when it is mounted with the rod 2 in the horizontal plane and where the direction of vibration of the test stand is in the vertical plane. The equation parameters (position of inertial mass) may then be chosen so as to result in any desired switch resonant frequency.

As the vibration test stand vibrates in the horizontal plane as illustrated in FIG. 1, the lower pivoted end of the rod 8 of the switch vibrates in synchronism with the test stand while the other end of the rod on which the inertial mass is mounted remains stationary in space so that the contact arms 16 are alternately electrically connected to the spring contacts 19. The output current of the magnetic pickup 21 is sinusoidal in phase and of the same frequency as the vibrational movement of the rod 8 and applied to the primary 42 of transformer 31 so that the output across the secondary of the transformer is of the same waveshape as that produced at the pickup. The spring contacts 19 are permanently connected to the secondary terminals 34 and 35 of transformer 31 and the contact arms 16 connect alternately and in synchronism with the sinusoidal voltage of the pickup applied at the primary terminals. Each of the secondary terminals serves to rectify this sinusoidal pickup voltage as it appears across the secondary and to apply the output therefrom to the filter circuit. Slight variations in the vibration frequency will not affect the filtered output since the magnetic pickup and the mechanical rectifier (switch) are both driven from a common source (test stand) and the rectifier or switch will follow any vibration frequency drift in the test stand almost immediately. This synchronous demodulator system, therefore, insures stability and ease of operation. If it is desired to vary the vibration frequency over an extended range a compensating network of any well known design may be introduced at the output of the magnetic pickup 21 to compensate for non-linearity introduced by operation over an extended frequency range.

The D.C. output voltage from the filter may be applied to a readout device (not shown) such as a voltmeter which had been previously calibrated to indicate in terms of voltage the displacement of the test stand. A simple control system (not shown) may be adapted for use with the above-described system by including a reference D.C. signal voltage source which is calibrated or proportional to the test stand displacement desired. The automatic displacement control system may be of the closed-loop system type wherein the parameter being controlled, which in this case is the test stand displacement, is constantly governed by the magnitude of the test stand displacement itself as well as the reference signal voltage. This is accomplished by any well known comparator or electronic control circuit which compares the filter output voltage (test stand displacement) with the reference signal (desired displacement) and produces a resultant error voltage which is the difference between the two signals. This error voltage, after being amplified, is then fed into a mechanical control unit which alters the displacement force being applied to the test stand in such a manner as to reduce the error signal to substantially zero and stabilize the displacement. Therefore, the setting of the reference signal voltage will govern the test stand displacement and the system will hold the displacement constant. By continuously varying the reference signal voltage the test stand displacement will follow this change.

If it is desired to merely determine the frequency of vibration, one simply applies the pickup voltage directly to an oscilloscope or frequency meter and determines the frequency of vibration.

It will be understood that various changes in the details, materials and arrangement of parts, which have been herein described and illustrated in order to explain the nature of this invention, may be made by those skilled in the art within the principle and scope of the invention, as expressed in the appended claims.

We claim:

1. A device for obtaining a D.C. voltage corresponding to the amplitude of movement of a member having a periodic recurrent motion relatively to a stationary base which comprises, means having one part carried by said member and a cooperating part carried by said base and creating in one of said parts an electrical current upon relative movement of said parts, a transformer having its primary winding connected to said one of said parts to receive therefrom said created current and having a grounded center tap on its secondary winding, a switch having spaced contacts connected respectively to the ends of said secondary winding and also a movable contact, a laterally inflexible element articulately connected to said member and mounting said movable contact for movement with said element in directions to engage said movable contact alternately with said spaced contacts with continued contact over a substantial continued movement of said movable contact, with the movable contact just leaving one of said spaced contacts as it begins engagement with the other of said spaced contacts, inertial means connected to said element and serving by its inertia as a relatively fixed center about which said element is moved in synchronism with said member to which said element is articulately connected, means connected to said element for yielding by resisting displacement of said element in both directions from an intermediate position in which the movable contact is in engagement with both of said spaced contacts, whereby said switch operates in synchronism with said member and in synchronism with the amplitude variation of said created current to rectify said created current and create a D.C. voltage corresponding to the amplitude of movement of said member.

2. A device for obtaining a D.C. voltage corresponding to the amplitude of movement of a member having a periodic, recurrent motion relatively to a stationary base, which comprises means responsive to said motion for creating an alternating electrical current with a frequency and amplitude similar to the frequency and amplitude of motion of said member, a transformer having a primary winding connected to pass said current therethrough and also having a secondary winding with a center tap, a utilization circuit, circuit controlling means having a part connected to said member for movement therewith and alternately including in said circuit the end portions of said secondary winding during substantial movements of said last mentioned means, with the circuit through each end portion of the secondary winding just interrupted as the circuit through the other end portion of the secondary winding is established, inertial means connected to said part of said circuit controlling means and serving by its inertia as a relatively fixed center about which said part moves in synchronism with said member, and means connected to said part for yieldingly resisting displacement of said part in both directions from an intermediate position in which said circuit through both of said secondary end windings is concurrently completed, whereby said utilization circuit may be employed for comparison of its voltage with a reference voltage for control of the amplitude of said member.

3. A device for obtaining a D.C. voltage corresponding to the amplitude of movement of a member having a periodic recurrent motion relatively to a base, which comprises means responsive to said motion for creating a primary variable voltage current with a frequency and amplitude similar to the frequency and amplitude of said relative motion of said member, a circuit, having therein means responsive to said created current for producing in said circuit an A.C. voltage, a laterally inflexible element articulately connected to said member for movement synchronously therewith and having inertia means serving by its inertia as a relatively fixed center about which said element moves in synchronism with said member, switch means in said circuit and operated by said element for creating from said A.C. voltage a pulsating D.C. voltage of the same amplitude as said created current, and means for filtering said pulsating D.C. voltage to minimize voltage fluctuations therein, whereby said D.C. voltage corresponds to the amplitude of movement of said member and further may be employed for control of the movement of said member.

4. A selectively resonant vibration actuated switch for use with a member having a periodic recurrent motion relatively to a base, which comprises a laterally inflexible element, one end of which is articulately connected to said member for movement synchronously therewith and having selectively positioned inertia means serving by its inertia as a relatively fixed center about which said element moves in synchronism with said member, means connected to said element for yieldingly resisting displacement of said element in both directions from an intermediate position when subjected to movement by the motion of said member, switch means operated by said element whereby the switching action is in synchronism with the movement of said member.

5. A selectively and adjustably mechanically resonant vibration actuated switch for use with a member having a periodic recurrent motion relatively to a base, which comprises a laterally inflexible element one end of which is pivotally mounted on said member for synchronous displacement and movement in the direction of the motion of said member, inertia means selectively and adjustably positioned on and lengthwise of said element serving by its inertia as a relatively fixed center about which said element moves in synchronism with said member, restoring means connected to said element intermediate of the said one end and said inertia means yieldingly resisting displacement of said element in both directions from an undeflected position when caused to move by the motion of said member, switch means operated by said element and disposed intermediate of said one end and said restoring means whereby the switching action is in synchronism with the movement of said member and the resonant frequency of said switch can be adjusted below that of the member.

6. The switch according to claim 5 wherein said laterally inflexible element is a stiff electrically nonconducting rod.

7. The switch according to claim 6 wherein said inertia means is an inertial mass having a passage through its center and is mounted on said rod with said rod passing through said mass, means for selectively and adjustably locking said inertial mass on said rod.

8. A selectively and adjustably mechanically resonant vibration actuated switch for use with a member having a periodic recurrent motion relatively to a base, which comprises a laterally inflexible element one end of which is pivotally mounted on said member for synchronous displacement and movement in the direction of the motion of said member, inertia means selectively and adjustably positioned on and lengthwise of said element serving by its inertia as a relatively fixed center about which said element moves in synchronism with said member, said member further including two portions which extend laterally therefrom and spaced from said rod and aligned with the direction of movement of said rod, restoring means partly carried by said portions and said element intermediate of the said one end and said inertia means yieldingly resisting displacement of said element in both directions from an undeflected position when caused to move by the motion of said member, switch means operated by said element and disposed intermediate of said one end and said restoring means whereby the switching action is in synchronism with the movement of said member and the resonant frequency of said switch can be adjusted below that of the member.

9. The switch according to claim 8 wherein said restoring means are a pair of coiled springs disposed on opposite sides of said rod and aligned with one another and aligned with the direction of motion of said rod.

10. The switch according to claim 9 wherein said switching means is partly carried by said rod and partly by said lateral extension of said member.

11. A vibration actuated switch, whose mechanical resonance may be selectively adjusted, for use in conjunction with a member having a periodic recurrent motion relatively to a stationary base, which comprises a laterally inflexible stiff, electrically nonconducting rod element one end of which is pivotally mounted on said member for synchronous displacement and pivotal movement in the direction of the motion of said member, said member also having a pair of lateral extensions spaced from and extending in a direction substantially lengthwise of said rod and aligned with each other in the direction of movement of said member, an inertial mass selectively and adjustably mounted on said rod for positioning along the length of said rod serving by its inertia as a relatively fixed center about which said rod moves in synchronism with said member, a pair of coil springs, each of said springs supported intermediate of said inertial mass and said one end of said rod, and having one end fixed to one of the lateral extensions of said member and the other end of said springs fixed on opposite sides of said rod with axes of said springs aligned with one another and with the direction of movement of said rod, switch means a part of which is carried by said rod intermediate of said one end of said rod and said coil spring operated by the relative movement of said rod element, another part carried by said lateral extension whereby said switch means is activated in mechanical synchronism with the movement of said member and the mechanical resonance of said switch may be selected to be outside of the operating frequency range of said member.

12. The switch according to claim 11 wherein the distance lengthwise of said rod from said one end of said rod to the coil spring, the distance lengthwise of said rod from said one end of said rod to the inertial mass, the mass of said inertial mass and the spring constant of said coil spring are selected relatively to one another according to the formula $$w^2 = g/l + 2ka^2/ml^2$$

where "$w$" is the mechanical resonant frequency of the switch, "$g$" is the gravitational constant, "$l$" is the distance from said one end to the inertial mass, "$k$" is the spring constant of said coil spring, "$a$" is the distance from said one end to the coil spring and "$m$" is the mass of the inertial mass.

References Cited in the file of this patent

UNITED STATES PATENTS

| | | |
|---|---|---|
| 1,298,727 | Jackson | Apr. 1, 1919 |
| 1,397,525 | Kennedy | Nov. 22, 1921 |
| 1,487,298 | Vennes | Mar. 18, 1924 |
| 1,990,566 | Ramsden | Feb. 12, 1935 |
| 2,010,897 | Rodel | Aug. 13, 1935 |
| 2,103,190 | Squire | Dec. 21, 1937 |
| 2,152,256 | Hewitt | Mar. 28, 1939 |
| 2,773,389 | King | Dec. 11, 1956 |
| 2,887,545 | Hosking | May 19, 1959 |